United States Patent [19]

Wang et al.

[11] Patent Number: 4,639,926
[45] Date of Patent: Jan. 27, 1987

[54] EFFICIENT CATHODE ASSEMBLY FOR METAL VAPOR LASER

[75] Inventors: Shing C. Wang, Arcadia; Randolph W. Hamerdinger, Glendora, both of Calif.

[73] Assignee: Xerox Corporation, Stamford, Conn.

[21] Appl. No.: 158,000

[22] Filed: Jun. 9, 1980

[51] Int. Cl.⁴ .............................................. H01S 3/097
[52] U.S. Cl. ......................................... 372/87; 372/56
[58] Field of Search .................. 331/94.5 G, 94.5 PE, 331/94.5 P; 372/56, 87, 66, 88, 68

[56] References Cited

U.S. PATENT DOCUMENTS

| | | | |
|---|---|---|---|
| 3,402,367 | 9/1968 | Kobayashi | 372/88 |
| 3,755,756 | 8/1973 | Silfvast | 372/56 |
| 3,883,818 | 5/1975 | Heising et al. | 372/56 |
| 4,021,845 | 5/1977 | Wang | 331/94.5 G |
| 4,287,484 | 9/1981 | Wang et al. | 372/56 |
| 4,295,103 | 10/1981 | Ljudmirsky | 372/56 |

Primary Examiner—Léon Scott, Jr.
Attorney, Agent, or Firm—Franklyn C. Weiss

[57] ABSTRACT

An improved negative glow discharge hollow cathode device for generating laser radiation. The device comprises a hollow cathode assembly substantially surrounded by an anode envelope having a body section and a pair of end sections, each of the end sections terminating in a radiation transmission member. The metal laser medium is enclosed in the vicinity of the perforations in the cathode such that the metal vapor can be readily introduced into the cathode central region effectively and efficiently. The anode to cathode discharge paths is reduced by the use of an anode screen such that the glow discharge is directed into the cathode central region with a controlled discharge gap for optimum pressure and confined negative glow discharge within the cathode. The metal laser medium, in the form of a metal foil or sheet, is lined adjacent the cathode outer surface and perforated cathode holes in the lower half portion of the cathode. Metal vapor is released into the cathode by evaporation due to sputtering and heating of the discharge, the metal vapor being confined within the cathode by the cataphoretic pumping from the anode screen and recondensation onto the cathode inner surface. An insulation sleeve adjacent the metal foil has one row of equally spaced slots and provides a uniform discharge gap and path along the cathode by aligning the slots with the perforated holes on the upper portion of the cathode.

The anode screen is wrapped around the insulator sleeve and electrically connected to the outer vacuum anode envelope. The glow discharge is maintained from the anode through the slots into the cathode inner space. Since the cathode outer surface is insulated by the sleeve, the discharge is effectively confined.

22 Claims, 5 Drawing Figures

EFFICIENT CATHODE ASSEMBLY FOR METAL VAPOR LASER

BACKGROUND OF THE INVENTION

This invention relates to radiation emission devices in general, and in particular to radiation emission devices of the type which are frequently referred to as lasers. Lasers are generally characterized by an elongated envelope containing a material which can be raised from an initial energy state to a so-called excited energy state. The particular means used to excite the material in the envelope may vary. Thus, depending on the type of laser used, optical, electrical or chemical excitation means may be employed.

After excitation, radiation may be emitted spontaneously as the excited material returns to a more stable energy level, and/or through stimulated emission. In either case, the wavelength of the radiation so emitted is proportional to the energy difference between the energy levels of the transition involved. This, in turn, depends upon the inherent characteristics of the material itself.

The radiation, which propagates at a constant wavelength, generally leaves the envelope via radiation transmission means disposed at both ends thereof. The radiation transmission means are typically tranlucent windows which are often, but not necessarily, inclined at an angle which optimizes a particular polarization of light. This inclination is usually referred to as Brewster's angle, and the windows so inclined are often characterized as Brewster's windows.

Lasers of the type described typically include reflection means such as concave mirrors located at predetermined distance beyond each translucent window. The mirrors are aligned such that the radiation emitted from a translucent window is reflected back into the envelope to stimulate the emission of a substantially increased amount of radiation which then passes through the opposite window. This increased radiation is likewise reflected back into the envelope by the other mirror, thereby increasing the emitted radiation even more. As the radiation is continuously reflected back and forth through the envelope, greater and greater amounts of radiation are produced. It is in this manner that the energy of stimulated emission of radiation is "amplified" by the laser device. Of course, in order to enable the amplified radiation to escape therefrom, at least one of the mirrors are generally made only partially reflective.

Many different materials may be used to effect radiation emission, including certain members of the class of materials known as metals. Because the metals used in this type of laser must generally be transformed from a normally solid or liquid state, to a gaseous state in order to effect excitation, such lasers are frequently referred to as metal vapor lasers. It is thus clear that in metal vapor lasers, excitation means must be provided which first vaporize the metal and then raise the vaporized metal from an initial energy state to an excited energy state.

In general, gas lasers may be categorized into two main configuration types; a positive column type laser as described, for example, in U.S. Pat. No. 4,187,474 and; hollow cathode lasers as described, for example, in U.S. Pat. Nos. 4,021,845 and 4,052,680. The hollow-cathode laser tubes generally provide a higher gain for a smaller tube size for the same output than a positive column type laser device.

Although the negative glow discharge hollow cathode lasers disclosed in the latter mentioned patents provides very satisfactory performance, improvement on the overall laser efficiency by reducing the required input power for threshold laser action would be desirable.

SUMMARY OF THE PRESENT INVENTION

The present invention provides an improved negative glow discharge hollow cathode device for generating laser radiation. The device comprises a hollow cathode assembly substantially surrounded by an anode envelope having a body section and a pair of end sections, each of the end sections terminating in a radiation transmission member. A metal laser medium is enclosed in the vicinity of perforations in the cathode structure such that the metal vapor can be readily introduced into the cathode central region effectively and efficiently. The anode to cathode discharge paths is reduced by the use of an anode screen such that the glow discharge is directed into the cathode central region with a controlled discharge gap for optimum pressure and confined negative glow discharge within the cathode. The metal laser medium, in the form of a metal foil or sheet, is lined adjacent the cathode outer surface and perforated cathode holes in the lower half portion of the cathode. Metal vapor is released into the cathode by evaporation of the laser medium due to sputtering and heating of the discharge, the metal vapor being confined within the cathode by the cataphoretic pumping from the anode screen and recondensation onto the cathode inner surface. An insulation sleeve adjacent the metal foil has one row of equally spaced slots and provides a uniform discharge gap and path along the cathode by aligning the slots with the perforated holes on the upper portion of the cathode.

The anode screen is wrapped around the insulator sleeve and electrically connected to the outer vacuum anode envelope. The glow discharge is maintained from the anode through the slots into the cathode inner space. Since the cathode outer surface is insulated by the sleeve, the discharge is effectively confined.

It is an object of the present invention to provide an improved negative glow discharge hollow cathode device for generating laser radiation.

It is a further object of the present invention to provide an improved hollow-cathode laser wherein the required input power for threshold laser action is substantially reduced.

It is still a further object of the present invention to provide a hollow-cathode laser having an improved cathode structure which increases the overall laser efficiency via effective utilization of the discharge power in creating uniform confined metal vapor within the cathode and providing a confined negative glow discharge.

DESCRIPTION OF THE DRAWINGS

For a better understanding of the invention as well as other objects and further features thereof, reference is made to the following description which is to be read in conjunction with the drawing wherein.

DESCRIPTION OF THE PREFERRED EMBODIMENT

Figure 1:
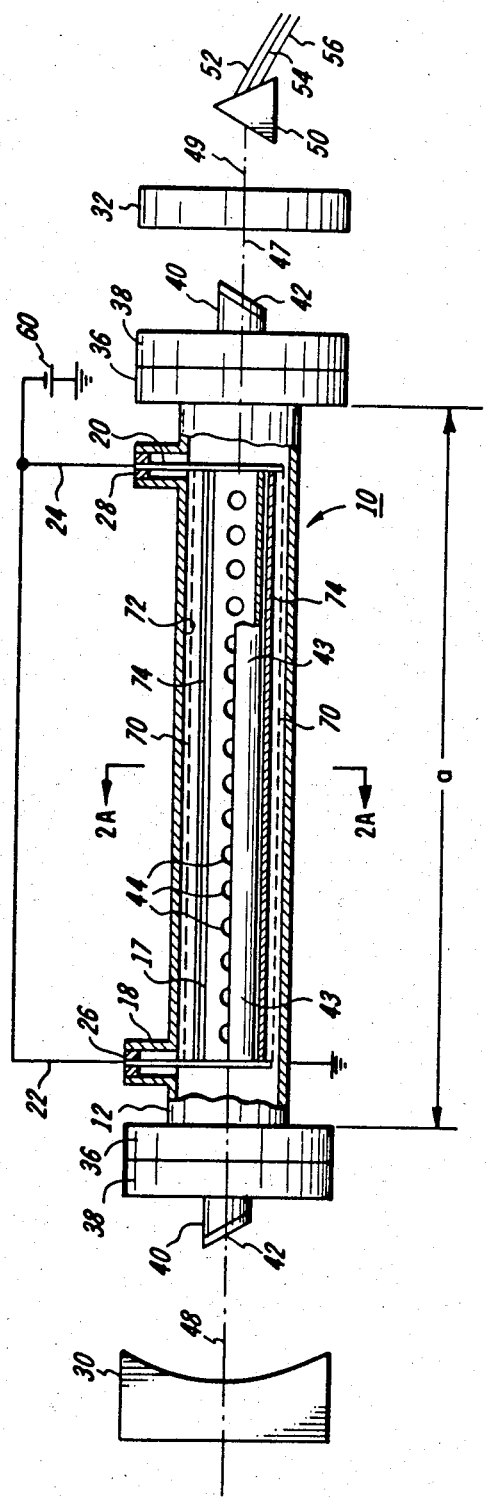
FIG. 1 is a partial sectional side view of the laser tube of the present invention.

Referring now to FIG. 1, a partial sectional view of the laser tube configuration of the present invention is shown. In particular, a discharge tube 10 comprises a gas containing metal envelope 12. Typical materials for envelope 12 include stainless steel, copper and Kovar, the envelope, or anode 12, being grounded as shown. A cathode assembly 16, described in more detail hereinafter, is supported by cathode pins 18 and 20 within the envelope 12. Cathode pins 18 and 20 are connected to leads 22 and 24, respectively. Ceramic insulators 26 and 28 are provided to insulate the cathode pins from the grounded envelope 12. The portion of metal envelope 12 which is concentric with cathode assembly 16 functions as the tube anode, although the anode section, in essence, extends between flange members 36 (dimension a) as shown.

Axially aligned with hollow-cathode assembly 16 and forming the end elements of the laser optical cavity are totally reflecting planoconcave mirror 30 and an output mirror 32 which transmits a portion of the laser light incident thereon.

The ends of discharge tube envelope 12 are sealed to metal vacuum flange members 36 which in turn is sealed to metal vacuum flange members 38. Extensions 40 are sealed to Brewster windows 42 as shown. Metal vacuum flange members 36 and 38 and extensions 40 may comprise stainless steel. It should be understood that the present invention is equally applicable to a laser where the optical resonator forms an integral part of the discharge tube 10. In this case, Brewster windows 42 are replaced with the optical resonator mirrors 30 and 32. The techniques for sealing windows or mirrors to metal flanges and sealing metal flanges to the metal discharge envelope 12 are well known and will not be set forth herein. As will be set forth in more detail hereinafter, laser active medium 43, which may be, for example, cadmium, zinc or copper, is introduced into the laser tube 10 in the form of a metal foil, or sheet, 43, which extends substantially along the length of cathode 17 and which is subsequently converted to atomic vapor form by vaporization of the metal. Metal structure 43 is substantially in contact with cylindrical structure 17. The discharge between anode 70 and cathode assembly 16 will cause the metal 43 placed adjacent perforations 44 in cathode 17 to quickly vaporize by the heat of the discharge or by sputtering. Note that in the present invention an external heater is not required to vaporize the metal laser medium, thereby reducing the power required to operate the overall laser system. The cadmium vapor so generated is diffused through the perforations 44 in the lower portion of cathode 17 into the cathode where the main laser activity takes place thus shortening the diffusion path so faster start-up and effective confinement of vapor can be achieved to ensure efficient operation. The electrical discharge is produced by applying a dc potential from source 60 to cathode pins 18 and 20 via leads 22 and 24, respectively. A typical range of potential is from about 300 to about 400 volts dc. Also confined within the envelope 12 may be a buffer gas, such as helium. The discharge between anode and cathode assembly 16 excites the helium atoms to an elevated energy state from which the energy is imparted to the vaporized cadmium atoms. This causes the cadmium to be selectively excited to the required excited energy levels necessary for lasing action. As will be explained hereinafter in more detail, the top row of perforated cathode holes 44 formed on cathode 17 allow the discharge to carry into and be confined within cathode 17 thus forming the discharge patterns shown in FIGS. 2A and 2B (note that metal member 43, anode screen 70 and insulator 74 are shown spaced apart for purposes of clarity. Actually, member 43 contacts cathode 17, insulator 74 is in contact with member 43 (before member 43 is evaporated) and anode screen 70 is in contact with insulator 74). The main laser action occurs within this cathode confined discharge region where helium ions and cadmium atoms exchange energy through collisional processes. The continuous wve (CW), simultaneous radiation of red, green and blue laser transitions composed into a beam of white light 47 produced by the aforementioned collisional processes is generated along the axis 48, through Brewster windows 42 and to the cavity mirrors 30 and 32. A portion of this white light beam 49 is transmitted by mirror 32, and can be dispersed into its component prime colors by prism 50 as shown. Alternate dispersive optical elements may be utilized in place of prism 50.

Figure 2A:
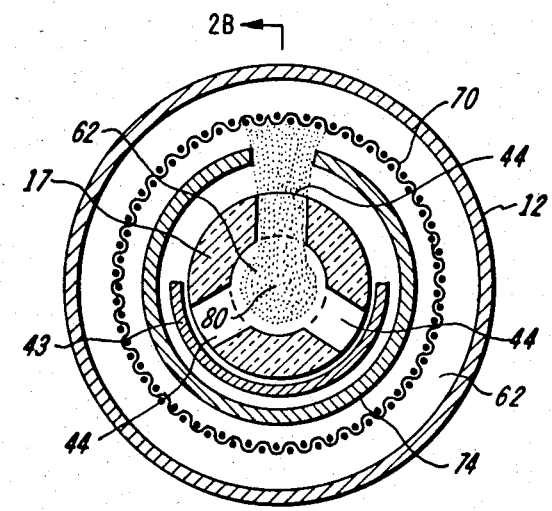
FIG. 2A is a representational cross-sectional view of the hollow-cathode utilized in the laser tube of FIG. 1 along line 2A—2A thereof and illustrating the tube discharge characteristics and FIG. 2B is a section along line 2B—2B of FIG. 2A illustrating the discharge characteristics of the hollow cathode utilized in the laser tube of FIG. 1.
Figure 2B:
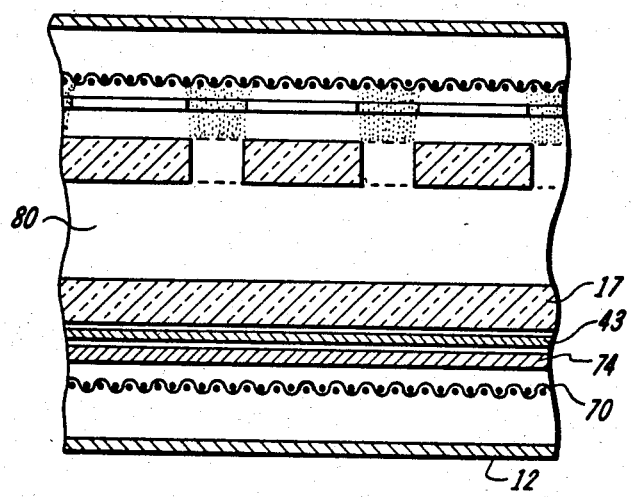

The constructinal parameters of the laser tube shown in FIG. 1 will now be set forth. It should be noted that the combination of the cadmium active laser medium and the helium gas produces laser action at the wavelengths of 4416, 5337, 5378, 6355 and 6360 angstroms, with simultaneous laser operation at the blue (4416 Å), green (5337 Å, 5378 Å) and red (6335 Å, 6360 Å) of the visible Cd+ transitions using wide band mirrors. A typical hollow-cathode structure consists of a 50 centimeter long, 7.5 millimeter inner diameter Kovar or molybdenum tube held inside a 2.5 centimeter outer diameter stainless steel anode cylinder and vacuum envelope 12. The cathode cylinder is perforated and may comprise three parallel rows of 3 millimeter diameter holes 44 spaced 120° apart azimuthally and 6 millimeters apart axially along the entire length of the cathode as shown in FIGS. 2A and 2B. The cathode tube may be supported concentrically inside the anode tube either by flexible pins from side-mounted vacuum feedthroughs in the anode tube at each end of the cathode, as shown in FIG. 1, or by concentric ceramic collars near each end. The overall length of the optical cavity, including the end mirrors, is approximately 90 centimeters, the active cathode length being approximately 50 centimeters. The perforated cathode 17 preferably comprises molybdenum and the metal laser medium 43, which may comprise, for example, cadmium, zinc or copper, is positioned in the vicinity of the perforations 44 in the lower portion of cathode 17 such that the metal vapor can be readily introduced into the cathode central region effectively and efficiently. The anode to cathode discharge paths is reduced by the use of an anode screen 70, extending substantially along the length of cathode 17 and electrically coupled to anode 12 via lead 72, such that the glow discharge is directed into the cathode central region through the perforated holes 44 on the upper portion of the cathode with a controlled, relatively short discharge gap (discharge easier to strike) for optimum pressure and the negative glow discharge is confined within the cathode 17. Anode screen 70 also functions as the support structure for the cathode assembly 16 which comprises metal foil 43, cathode 17, and insulator 74 within anode 12. These features are in contradistinction to the structure disclosed in the aforementioned patents wherein the metal vapor is provided by discharge heating or external heating of the outer anode envelope (the metal being placed in contact with the envelope) and wherein the negative glow is attached to both the outer and inner cathode space.

In particular, the new cathode assembly 16 of the present invention comprises the aforementioned metal foil or sheet 43 lined against the cathode outer surface and perforated cathode holes 44 in the lower half portion of the cathode 17. The metal vapor is released into cathode 17 through the lower perforated holes by sputtering and heating of the discharge, the metal vapors being confined within the cathode by cataphoretic pumping from anode screen 70 and recondensation onto the cathode inner surface. The insulator sleeve 74, which may be quartz or ceramic, is in contact with foil 43 and holds metal foil 43 against the cathode and preferably has a single row of equally spaced slots 76 along its circumference which provides a uniform discharge gap and path along the cathode by alignment of slots 76 with respect to the corresponding perforated hole 44 on the upper portion of the cathode 17. Alternately, insulator sleeve 74 may have one uniform slot along its length. the insulator sleeve 74, in essence, efficiently confines and directs the discharge into the cathode whereat lasing action occurs and extends substantially along the length of cathode 17.

The anode screen 70 is made of fine mesh of stainless steel or tungsten (for example, 100×100 mesh) and is wrapped around and in contact with the insulator sleeve 74 and electrically connected to the outer vacuum envelope 12 via 13 lead 72. The glow discharge is maintained from the anode through each slot 76 and perforated hole 44 into the cathode inner space. Since the cathode outer surface is insulated by insulator sleeve 74, the discharge is effectively confined to that area.

The cathode assembly 16 described hereinabove provides about a fifty percent reduction in required input power for threshold laser action as compared to the lasers described in the aforementioned patents. The cathode assembly increases the overall laser efficiency via its effective utilization of discharge power in creating uniform confined metal vapor within the cathode and providing a well confined negative glow discharge. Further, metal vaporization is essentially confined and concentrated in the center of the cathode and the positioning of the metal 43 as shown allows the vapor to rapidly be introduced into the discharge zone where lasing action occurs.

Figure 3:
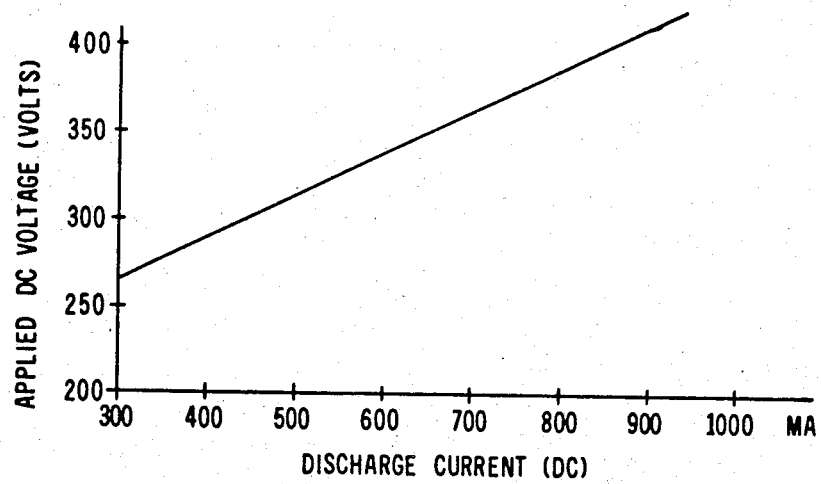
FIG. 3 is a plot illustrating the typical V-1 characteristics for the helium-cadmium discharge utilizing the laser tube of FIG. 1.
Figure 4:
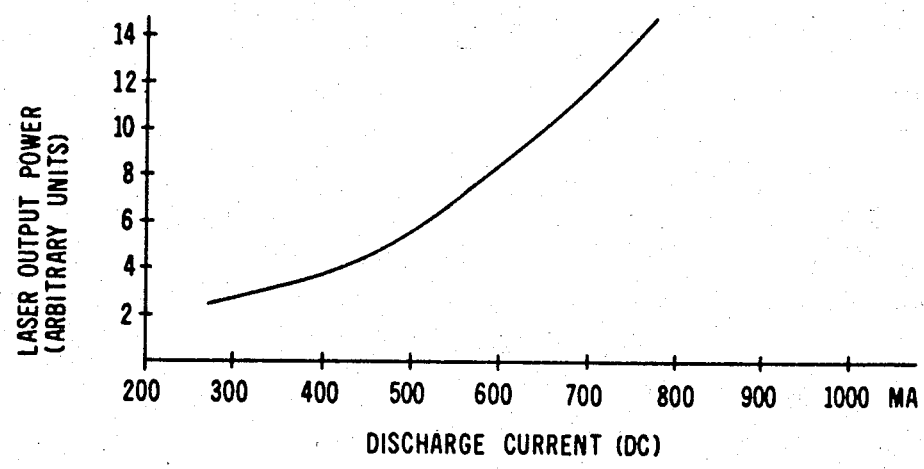
FIG. 4 shows the typical power output in white radiation as a function of the excitation current.

In operation, an intense, uniform, bright cathode glow 80 fills the inside of the hollow-cathode tube as shown in FIGS. 2A and 2B except for an annular cathode-fall region 62 (dark) around the inside periphery of the cathode 16. Tenuous plasma columns extend out through the cathode holes and carry the discharge to the anode. FIG. 3 shows a typical dc voltage-current characteristic of the discharge for a helium pressure of 8.5 Torr and a tube temperature of approximately 300° C. The discharge is characterized by a sustaining voltage of approximately 300 volts. For helium-cadmium mixtures, the sustaining voltage increases as the cadmium vapor pressure increases. The helium-cadmium laser may be operated in the temperature range from approximately 300° C. to about 350° C., (corresponding to a range from about 0.045 Torr to about 0.3 Torr cadmium pressure), a helium pressure in the range from about 4 Torr to about 18 Torr, dc excitation in the range from about 300 volts to about 400 volts and a corresponding discharge current in the range from approximately 200 milliamperes to about 800 milliamperes. Typically, in order to produce a white laser output, the laser tube was successfully operated at 320° C., a helium pressure of 8 torr, dc excitation of 300 volts and a discharge current of 600 milliamperes. The laser mirrors 30 and 32 are generally characterized as broad band high reflectors with transmission of a few tenths of a percent at the red, green and blue wavelengths. It should be noted that laser output power depends on the helium pressure for each of the three colors at a particular cathode temperature. In the preferred embodiment, the laser is operated in the range of helium pressure from between 4 and 12 Torr. At higher pressures, it becomes difficult to obtain a balanced white laser light since the output power of the red laser becomes weaker. At lower pressures below 4 Torr the discharge tends to become difficult to sustain. The laser output power is also a function of the cadmium vapor pressure which is determined by the temperature of the laser tube. FIG. 4 illustrates a typical power output for the laser as a function of discharge current for a helium pressure of approximately 8.5 Torr and a temperature of the laser tube outer wall of approximately 300° C.

It should be understood that in lieu of metal envelope 12, a glass or ceramic vacuum envelope could be utilized. In this case (operating characteristics described hereinabove would be identical) an anode pin would be necessary for electrical connection to anode screen 70. The cathode assembly 16 (with anode screen 70) thus can be utilized in any envelope configuration.

The white light laser oscillations, as set forth hereinabove, were obtained at several various conditions on helium pressure, cadmium vapor density (in terms of the tube outer wall temperature) and current. The laser tube operating conditions may be further varied to extend the dynamic range of the white laser tube, the laser output power being optimized by proper design of the output coupling mirror.

In general, certain conditions should be met in order to obtain white laser oscillations. In particular, white laser oscillation requires an effective hollow-cathode discharge with the glow discharge substantially confined inside the cathode region. Further, a substantially uniform discharge along the cathode and a substantially uniform temperature profile along the tube are required to assure uniform cadmium vapor distribution. Additionally, the proper threshold excitation should be provided and the proper optical cavity selected.

These conditions hve been successfully attained by selecting the laser tube configuration as set forth hereinabove and operating the tube within the aforementioned ranges.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A metal vapor laser tube for generating simultaneous multi-line emissions comprising:
    a gas-filled envelope having a longitudinal axis, said gas including as a portion thereof a given metal vapor, an anode electrode forming a portion of said envelope;
    a cathode assembly comprising a perforated hollow cathode located within said envelope and coaxially disposed with respect to said anode electrode portion of said envelope and concentric therewith, a metal member positioned with respect to said hollow cathode, said metal member when vaporized providing said given metal vapor, and an insulator member in contact with said metal member;
    an anode screen interposed between said anode electrode and said cathode assembly and electrically coupled to said anode electrode;
    coaxially aligned end members, said end members and said envelope being adapted to provide a structure for confining a gaseous medium therein;
    means for generating a dc voltage; and
    means for applying said dc voltage between said anode screen and said cathode assembly whereby a discharge between said cathode and said anode screen is created, said gas being excited by said discharge for stimulating continuous wave, simultaneous multi-line emissions along the longitudinal axis of said cathode.

2. The laser tube as defined in claim 1 wherein said gas further comprises helium, the pressure of said helium being in the range from about 4 Torr to about 18 Torr.

3. The laser tube as defined in claim 1 wherein said metal member is cadmium, said metal being vaporized by the heat generated by said discharge and by sputtering.

4. The laser tube as defined in claim 3 wherein said laser tube is operated in the temperature range from approximately 300° C. to about 350° C.

5. The laser tube as defined in claim 1 wherein said end members are coaxially aligned optically transmissive windows.

6. The laser tube as defined in claim 1 wherein said end members are coaxially aligned laser mirrors.

7. The laser tube as defined in claim 1 wherein said metal member is in contact with said cathode.

8. The laser tube as defined in claim 1 wherein said anode screen comprises a mesh screen.

9. The laser tube as defined in claim 1 wherein said gas is excited by said discharge for stimulating continuous wave, simultaneous multi-line emissions in the form of substantially white light along the longitudinal axis of said cathode.

10. The laser tube as defined in claim 1 wherein the metal vapor is released into said cathode through perforations in said cathode.

11. The laser tube as defined in claim 1 wherein the discharge from the anode screen into said cathode is through said insulator member and perforations in said cathode.

12. A metal vapor laser tube for generating simultaneous multi-line emissions comprising:
    a gas-filled envelope having a longitudinal axis, said gas including as a portion thereof a given metal vapor;
    an anode electrode;
    a cathode assembly comprising a perforated hollow cathode located within said envelope and coaxially disposed with respect to said envelope and concentric therewith, a metal member positioned with respect to said hollow cathode, said metal when vaporized providing said given metal vapor, and an insulator member in contact with said metal member;
    an anode screen interposed between said envelope and said cathode assembly and electrically coupled to said anode electrode;
    coaxially aligned end members, said end members and said envelope being adapted to provide a structure for confining a gaseous medium therein;
    means for generating a dc voltage; and
    means for applying said dc voltage between said anode screen and said cathode assembly whereby a discharge between said cathode and said anode screen is created, said gas being excited by said discharge for stimulating continuous wave, simultaneous multi-line emissions along the longitudinal axis of said cathode.

13. The laser tube as defined in claim 12 wherein said gas further comprises helium, the pressure of said helium being in the range from about 4 Torr to about 18 Torr.

14. The laser tube as defined in claim 12 wherein said metal member is cadmium, said metal member being vaporized by the heat generated by said discharge and by sputtering.

15. The laser tube as defined in claim 14 wherein said laser tube is operated in the temperature range from approximately 300° C. to about 350° C.

16. The laser tube as defined in claim 12 wherein said end members are coaxially aligned optically transmissive windows.

17. The laser tube as defined in claim 12 wherein said end members are coaxially aligned laser mirrors.

18. The laser tube as defined in claim 12 wherein said metal member is in contact with said cathode.

19. The laser tube as defined in claim 12 wherein said anode screen comprises a mesh screen.

20. The laser tube as defined in claim 12 wherein said gas is excited by said discharge for stimulating continuous wave, simultaneous multi-line emissions in the form of substantially white light along the longitudinal axis of said cathode.

21. The laser tube as defined in claim 12 wherein the metal vapor is released into said cathode through perforations in said cathode.

22. The laser tube as defined in claim 12 wherein the discharge from the anode member into said cathode is through said insulator member and perforations in said cathode.

* * * * *